United States Patent

Feher

[11] Patent Number: 5,911,448
[45] Date of Patent: Jun. 15, 1999

[54] COUPLING FOR COMPOSITE HOSE AND METHOD OF MAKING SAME

[76] Inventor: Istvan Feher, 2 Baldwin Avenue, Point View, R.R. #5, Forest, Ontario, Canada, N0H 1J0

[21] Appl. No.: 08/745,685

[22] Filed: Nov. 8, 1996

[51] Int. Cl.⁶ ................................................. F16L 33/20
[52] U.S. Cl. .............................. 285/222.5; 285/222.1; 285/256; 285/259; 285/251
[58] Field of Search ................... 285/222.1–222.5, 285/251, FOR 131, 256, 259

[56] References Cited

U.S. PATENT DOCUMENTS

| | | | |
|---|---|---|---|
| 1,343,967 | 6/1920 | Gilson | 285/222.2 |
| 2,277,397 | 3/1942 | Graham | 285/222.4 |
| 2,473,441 | 6/1949 | Muller | 285/222.2 |
| 2,915,323 | 12/1959 | Cullen et al. | 285/222.5 |
| 3,112,937 | 12/1963 | Williams | 285/222.2 |
| 3,413,020 | 11/1968 | Johns . | |
| 3,835,891 | 9/1974 | White . | |
| 3,916,505 | 11/1975 | White . | |
| 3,992,044 | 11/1976 | Muslin . | |
| 4,400,022 | 8/1983 | Wright . | |
| 4,407,532 | 10/1983 | Patel et al. . | |
| 4,498,691 | 2/1985 | Cooke . | |
| 4,804,212 | 2/1989 | Vyse . | |
| 5,105,854 | 4/1992 | Cole et al. . | |
| 5,137,309 | 8/1992 | Beagle . | |
| 5,209,267 | 5/1993 | Morin . | |
| 5,255,944 | 10/1993 | Blin et al. . | |
| 5,317,799 | 6/1994 | Chapman et al. . | |

FOREIGN PATENT DOCUMENTS

| | | | |
|---|---|---|---|
| 511387 | 3/1955 | Canada | 285/131 |
| 932212 | 8/1955 | Germany | 285/251 |
| 471439 | 6/1953 | Italy | 285/251 |
| 625446 | 9/1961 | Italy | 285/131 |
| 268466 | 4/1927 | United Kingdom | 285/251 |
| 449042 | 6/1936 | United Kingdom | 285/251 |
| 550153 | 12/1942 | United Kingdom | 285/251 |
| 880324 | 10/1961 | United Kingdom . | |
| 1004859 | 9/1965 | United Kingdom . | |
| 1058279 | 2/1967 | United Kingdom . | |
| 1062991 | 3/1967 | United Kingdom | 285/131 |
| 2104992 | 3/1983 | United Kingdom . | |

*Primary Examiner*—Eric K. Nicholson
*Attorney, Agent, or Firm*—Cummings & Lockwood

[57] ABSTRACT

A reinforced hose coupling including an end fitting having first and second, axially extending sections with the first section comprising a connector and a second section providing a nipple with external grooves. A metal ferrule is mounted on the nipple and is connected to the end fitting. The ferrule has an external depression formed in a side thereof. Two holes are formed in this depression and extend through the wall of the ferrule. A reinforced hose end having flexible tubular rubber or plastic layers is crimped between the ferrule and the nipple. The hose end has an outer wire extending about the exterior of the tubular layers. An end piece of this wire extends through the holes and across the depression helping to secure the hose end to the coupling and providing an indication to the user that the coupling is in usable condition. Preferably the ferrule is formed with a circumferentially extending internal rim at one end, which rim is forced into a circumferential groove formed in the end-fitting. A method and an apparatus are also provided for making the house coupling. The apparatus includes first and second annular dies each having a circular die opening with a predetermined minimum diameter. A mounting arrangement rigidly connects each die to a hydraulic ram so that each can be driven linearly along the exterior of the ferrule.

20 Claims, 4 Drawing Sheets

COUPLING FOR COMPOSITE HOSE AND METHOD OF MAKING SAME

BACKGROUND OF THE INVENTION

This invention relates to flexible hose couplings, particularly couplings suitable for use with reinforced hose, a method of making such couplings, and die apparatus for making the couplings.

A variety of hose couplings for flexible rubber and plastic hoses are known including couplings suitable for textile reinforced and metal reinforced hose. In many cases these couplings comprise two main members, one of which is a nipple or end fitting having a portion thereof that is inserted into the end of the hose, and the other of which is a metal ferrule or sleeve member that extends about the exterior of the hose end. Often the ferrule is mechanically connected to the nipple member such as by means of threads or by an internal rim formed on one end of the ferrule, which end is driven into a circumferential groove formed in the nipple member. The ferrule or outer sleeve is made crimpable. By using a die set, the ferrule can be crimped or forced inwardly to clamp the hose end tightly between the ferrule and the nipple member.

U.S. Pat. No. 3,835,891 which issued Sep. 17, 1974 to Compoflex Company Limited is illustrative of a high pressure flexible hose developed in recent years and employing inner and outer helical wires for reinforcement. This hose may comprise several tubular layers of a plastics material which extends between the helical wires. These flexible layers can, for example, comprise fluorinated ethylene propylene copolymer. The inner helical wire is preferably coated with fluorinated ethylene propylene copolymer of Teflon®. For the conveyance of chemicals, layers of polypropylene fabric and polypropylene film are laid on the copolymer. The hose can be covered on its exterior with a coating of PVC (polyvinylchloride). By the use of helical wires on the inside and outside, this type of hose is capable not only of withstanding high internal pressures but it is also capable of full suction.

A metal coupling for the aforementioned wire reinforced hose is known in the industry, this coupling comprising a nipple member and a surrounding ferrule or sleeve. An external two start thread is formed on a section of the nipple having a reduced diameter. One of the grooves of this thread receives the inner helical wire of the hose while the other groove accommodates the inward bends of the flexible, tubular portion of the hose. The nipple is inserted into the end of the hose by a threading operation. An iron of steel ferrule is placed around the hose end and a flexible seal can be arranged adjacent the hose end between the nipple and the ferrule. The ferrule is provided with an inwardly extending flange or rim at one end. In addition to or instead of the aforementioned seal member, epoxy or other sealant material can be inserted between the ferrule and the end of the hose in order to provide a seal in the completed hose coupling. Once the sealing material is in place, the ferrule is then reduced in diameter by a suitable swaging process so that the end of the hose is compressed between the inside of the ferrule and the nipple. The swaging process results in a mechanical connection which helps to prevent the coupling from coming off the end of the hose. This connection is created between the inner helical wire and the threads or grooves formed on the exterior of the nipple.

Difficulties have been encountered in the art with the aforementioned coupling designed for a wire reinforced hose. One difficulty with this coupling and its method of manufacture arises from the tendency of the ferrule to bulge out during the manufacturing process. A bulging of the ferrule can result in seal failure. Another known difficulty is that the epoxy or secondary seal used in the coupling can sometimes be forced out of the space between the ferrule and the hose, leaving gaps or weaknesses in the seal.

U.S. Pat. No. 3,413,020 issued Nov. 26, 1968 to Samuel Moore & Company describes a fitting designed for composite tubing suitable for high pressure applications. The hose can be a polymeric composite tubing that has an inner helical wire extending about the interior of the tubing and laid along a helical cavity. For purposes of manufacturing the fitting, the last few turns of the helical wire are removed by means of pliers and wire cutters. The nipple or inner sleeve is formed with a helical, external thread which is threaded into the helical cavity formed in the hose end. The hose fitting is completed by an outer sleeve or ferrule having a series of internal teeth. These teeth engage against the outside of the hose end by crimping the outer sleeve inwardly. The ferrule is also held in place on the inner sleeve or nipple by means of threads formed at one end of the ferrule.

It is an object of the invention to provide a reinforced hose coupling which provides a secure connection between a hose end and the fitting itself and which is relatively inexpensive to manufacture. According to one aspect of the invention, the reinforced hose coupling is constructed for use with a reinforced hose end having an exterior helical wire. By projecting the end of the helical wire through holes formed in a depression in the side of the ferrule, not only a further mechanical connection between the hose end and the fitting is provided, but also an indicator that the hose coupling is in good condition for use.

It is a further object of the invention to provide a reinforced hose coupling wherein no separate sealant such as epoxy is required to seal the joint between the hose end and the fitting. The flexible tubular layers of the hose end extend beyond any helical wire that reinforces the hose and by clamping the extended tubular layers between the ferrule and the nipple member, a fluid tight seal can be formed.

It is an additional object of the invention to provide a method for making a coupling for reinforced flexible hose that has a helical wire extending about its interior. This manufacturing method can be carried out quickly using a first die and at least one follower die of smaller diameter on the metal ferrule of the coupling. It is the follower die or dies which cause the extension of the tubular layers to be clamped tightly between the ferrule and the nipple member.

SUMMARY OF THE INVENTION

According to one aspect of the invention, a reinforced hose coupling comprises an end-fitting having first and second, axially extending sections, the first section comprising a connecting element and the second section providing a nipple element having external grooves formed thereon. A metal ferrule is mounted on and about the nipple element and is connected to the end fitting. This ferrule has a generally cylindrical wall and an external depression formed in a side of this wall and projecting radially inwardly towards the nipple element. Two holes are formed in the depression and through the wall. A reinforced hose end having flexible tubular layers is crimped between the ferrule and the nipple element. This hose end has a helical wire extending about the exterior of the flexible tubular layers. An end piece of this wire extends through one of the holes, across the depression and back through the other hole.

Preferably the depression is elongate in the circumferential direction of the ferrule and the two holes are formed in opposite ends of the depression.

According to another aspect of the invention, a reinforced hose coupling comprises an end fitting having first and second axially extending tubular sections, the first and second sections being separated by a circumferential groove formed in an exterior surface of the end fitting. The first tubular section comprises a connecting element and the second section has an external helical groove that spirals about its circumference. There is also provided a flexible hose end comprising flexible tubular layers of plastics or rubber material and an inner helical wire extending about the interior of the tubular layers. The second section of the end fitting extends into the hose end so that the helical wire extends along and in the helical groove and circumferentially about the second section. An axial extension of the tubular layers extends beyond an adjacent end of the helical wire and along the exterior of the second section. The coupling includes a metal ferrule mounted on the hose end and extending around an end section of the helical wire and the axial extension of the tubular layers. This ferrule has an internal rim at one end which extends into the circumferential groove in order to mechanically connect the ferrule to the end fitting. The axial extension of the tubular layers is clamped between the ferrule and the end fitting, thereby forming a fluid tight seal.

In a preferred embodiment of this coupling, the hose end also has an outer helical wire extending about the exterior of the tubular layers and ending near the adjacent end of the inner helical wire.

According to a further aspect of the invention, there is provided a method of making a coupling for reinforced flexible hose, which method includes providing a flexible hose reinforced by means of a helical wire extending about the interior of the hose and having an end on which a coupling is to be provided. This hose includes flexible tubular layers which axially extend beyond an end of the helical wire at the end of the hose. A metal ferrule is placed over the hose and adjacent to the one end of the hose, this ferrule being formed with a circumferentially extending internal rim at an end of the ferrule closest to the one end of the hose. An end fitting is inserted into the one end of the hose, this fitting having first and second axially extending sections, the first section comprising a connecting element that projects from the one end of the hose and the second section providing a nipple element with external grooves formed thereon. The nipple element is placed in the hose so that the helical wire extends along the external grooves. The end fitting has an external, circumferential groove formed therein and spaced from the ends thereof. The metal ferrule is swaged with a first die so as to drive the internal rim into the circumferential groove and mechanically connect the ferrule to the end fitting. This step also clamps a portion of the helical wire in the external grooves of the nipple element which secures the hose to the end fitting. The metal ferrule is then swaged with a follower die of smaller diameter than the first die. This step clamps the tubular layers which extend beyond the end of the helical wire tightly between the ferrule and the end fitting in a sealing manner.

In a preferred version of this method, the end fitting is inserted into the one end of the hose by screwing the fitting relative to the hose end in order to thread the helical wire into the external grooves.

According to still another aspect of the invention, there is provided an apparatus for making a coupling for flexible hose reinforced by means of a helical wire extending about the interior of the hose, the apparatus includes a supporting device for holding one end of the hose and a generally cylindrical metal ferrule arranged over an end section of the hose during operation of the apparatus. The ferrule is formed with a circumferentially extending internal rim located at an end of the ferrule closest to said one end of the hose and having an initial first external diameter. A first annular die forms a circular die opening having a minimum diameter a little smaller than said first external diameter. A second annular die has a minimum diameter a little smaller than said minimum diameter of the first die. A mounting arrangement is also provided for rigidly connecting each of the first and second dies to a hydraulic ram so that each die can be driven linearly along the exterior of the ferrule starting at the end of the ferrule having the internal rim. The swaging action of the first die causes the end section of the hose, including an end portion of the helical wire, to be clamped firmly between the ferrule and an end-fitting positioned within the end section of the hose, and causes the internal rim to be deformed radially inwardly into an annular groove formed around the end-fitting. A subsequent swaging action with the second die causes a relatively short end portion of the hose having no helical wire extending about its circumference to be sealingly clamped between the ferrule and the end-fitting, this further swaging action occurring only along a section of the ferrule immediately adjacent said short end portion of the hose.

According to yet another aspect of the invention, a die apparatus for swaging a tubular metal body comprises a split die ring forming a circular opening and made up of two semi-annular die sections each having a radially inner surface for engaging and shaping the metal body and a radially outer surface which in radial cross-section extends at an acute angle to a central axis of the circular opening. An annular die body surrounds and supports the die ring, this die body having an annular, sloping engagement surface in contact with the radially outer surface of the die ring and parallel thereto. The die body has a number of pin passageways that extend radially through the die body. A number of holding pins each extend through a respective one of the pin passageways and have a head on a radially outer end thereof. A rotatable cam ring extends about the die body and has a number of slots formed therein and spaced about the circumference of the cam ring. Each of said slots extends in a generally circumferential direction and has a respective one of the pin heads captured therein. The pins can be moved radially outwardly by rotation of the cam ring from a first position where inner ends of the pins engage and hold the split die ring in the die body to a second position where the pins are disengaged from the split die ring.

Further features and advantages will become apparent from the following detailed description taken in conjunction with the accompanying drawings.

DETAILED DESCRIPTION OF PREFERRED EMBODIMENTS

Figure 1:
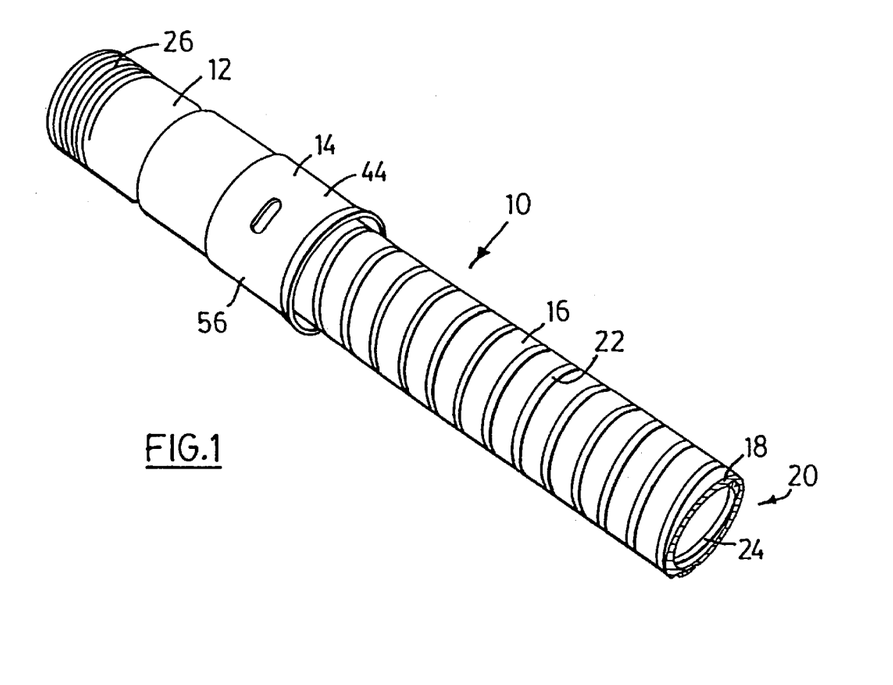
FIG. 1 is a perspective view of a reinforced hose coupling constructed in accordance with the invention, this coupling including a reinforced hose end.

A reinforced hose coupling 10 constructed in accordance with the invention generally comprises two main components, these being an end fitting or nipple member 12 and a metal ferrule or outer sleeve 14. In addition, the hose coupling can include the reinforced hose end 16. The construction of the hose end, which would normally be a portion of a long, flexible hose, may vary in its construction depending upon the particular application to which the hose is to be put. The hose end 16 illustrated in FIG. 1 includes several flexible tubular layers 18. The hose end is shown as cut off at end 20. The illustrated hose end includes an outer helical wire 22 which extends about the exterior of the flexible tubular layers 18. The hose end 16 includes an inner helical wire 24 extending about the interior of the tubular layers 18.

In a preferred form of hose sold by Feher Machine & Manufacturing Inc. of Sarnia, Ontario, the layers 18 comprise layers of polypropylene fabric and film which give the hose strength and chemical resistance while avoiding leakage or weeping. In one preferred form of the hose, the inner layer is a polypropylene reinforcing layer having a thickness of 2.5–3 mm. The outer support wire 22 can be made of various types of wire including galvanized wire, stainless steel wire (type 316), polypropylene coated wire and aluminum wire. The inner wire 24 can be galvanized carbon steel, stainless steel or polypropylene coated wire.

The hose coupling of the invention can also be used in association with other known reinforced flexible hose such as that described in U.S. Pat. No. 3,835,891. This hose also has inner and outer helical wires. The hose has an inner lining which includes the inner wire with at least one layer of fluorinated ethylene propylene copolymer superposed thereon. Layers of polypropylene fabric and polypropylene film are laid on the copolymer. There is an outer layer or cover made of PVC (polyvinylchloride), with this outer cover being surrounded by the outer helical wire.

Figure 2:
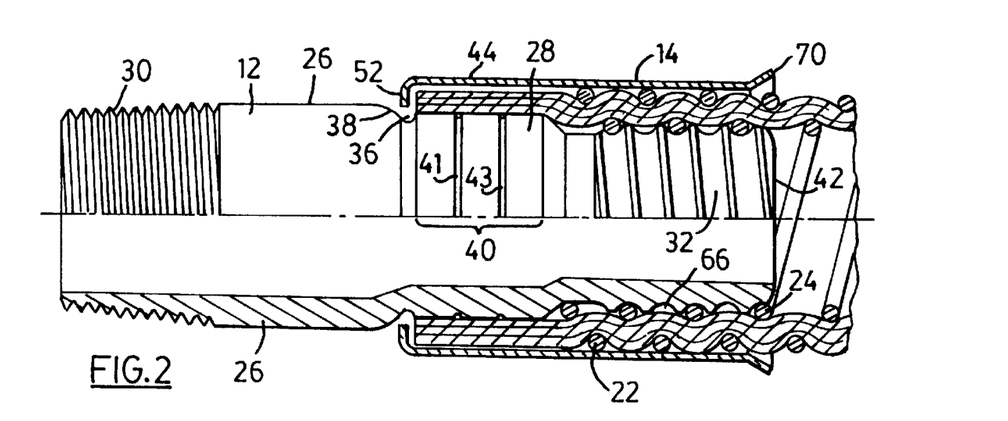
FIG. 2 is a side view of the combined end fitting or nipple member, the ferrule, and the hose end section with the lower half of the end fitting, the ferrule and the hose end section being in axial cross-section.
Figure 3:
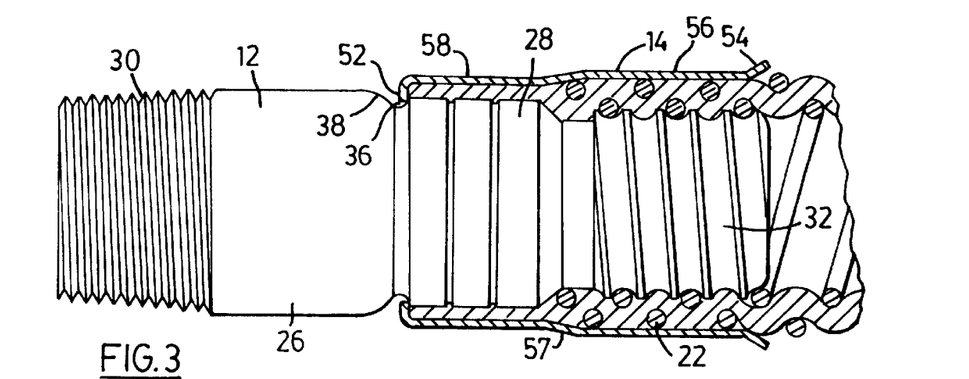
FIG. 3 is a side view of the reinforced hose coupling after swaging has been completed, with the ferrule and the hose end section being shown in axial cross-section for purposes of illustration.

A preferred form of end fitting 12 for use in the coupling of the invention is illustrated in FIGS. 2 and 3. This end fitting can be made of a variety of materials depending upon the particular application. Suitable materials for this fitting include carbon steel, stainless steel (316), aluminum, polypropylene, polyvinylchloride and Teflon®. The illustrated fitting 12 is made of metal and has first and second, axially extending sections 26 and 28. The first section comprises a connecting element and may be formed with exterior threads 30 to enable the fitting to be detachably connected to another fitting (not shown). The second section 28 provides a nipple element sized to fit inside the hose end snugly. This element is preferably provided with external grooves 32, the purpose of which is explained hereinafter. Preferably the grooves 32 form a two start thread which in effect results in there being two separate grooves located one beside the other.

The end fitting 12 is formed with an external, circumferential groove 36 which can be machined into the fitting. It is preferably formed at one end of a short slope 38 formed in the end fitting. The groove 36 should not be too deep so as not to weaken the coupling too much in this region. The coupling must be designed to withstand anticipated fluid pressures in the hose. With the groove 36 in this preferred position, the groove in effect separates the first and second sections of the end fitting.

Located between the groove 36 and the grooves 32 is a cylindrical section 40 of generally uniform diameter. Thus the helical grooves 32 extend only from one end 42 of the second section or nipple section 28 to a central portion of this second section. Preferably the section 40 has one or more small annular grooves 41, 43 formed therein to assist in the hose end sealing process as explained further below.

The construction of the ferrule 14 will now be described with reference primarily to FIGS. 2 and 3. The metal ferrule is mounted on or about the second section or nipple element 28 as shown and it is connected mechanically to the end fitting 12. The ferrule has a generally cylindrical wall 44 and, in one preferred version of the invention shown in FIG. 4, has an external depression 46 formed in a side of this wall for a purpose to be described. The depression projects radially inwardly towards the second section 28 and two holes 48 and 50 are formed in opposite ends of the depression, these holes extending through the wall 44. The depression 46 is preferably elongate in the circumferential direction of the ferrule.

In order to enable the ferrule 14 to be mechanically connected to the end fitting 12, the ferrule is formed with a circumferentially extending internal rim 52. As illustrated, this rim extends radially inwardly in a direction substantially perpendicular to the cylindrical surface of the ferrule. The rim 52 is forced by a die into the aforementioned groove 36 as shown in FIG. 3. At the other end of the ferrule, a short flare 54 can be formed in order to make it easier to place the ferrule on the reinforced hose. After the swaging steps are completed (as explained in detail below), the ferrule has preferably a first axially extending portion 56 with a first external diameter and a second axially extending portion 58 with a second external diameter which is somewhat less than the first external diameter. A short slope 57 forms a transition region between the portions 56 and 58.

Figure 4:
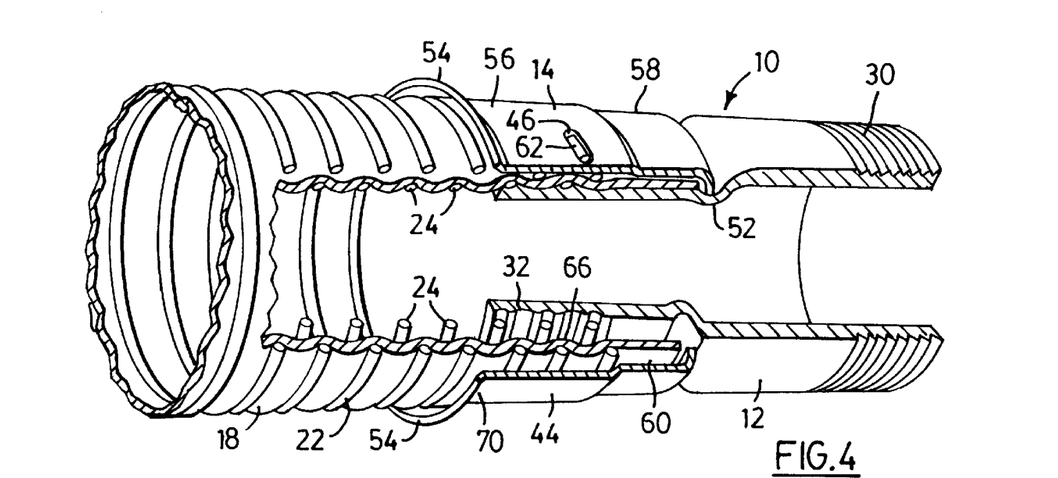
FIG. 4 is a perspective view of the reinforced hose coupling, with a portion of the coupling cut-away for purposes of illustration.
Figure 5:
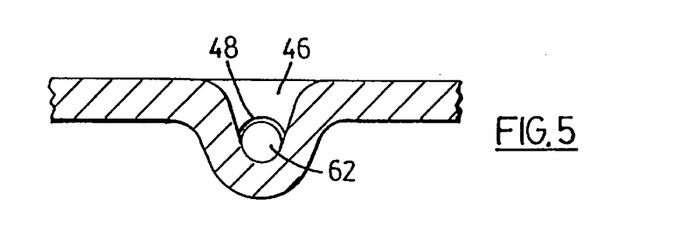
FIG. 5 is a detail view comprising a cross-section of the depression formed in the side of the ferrule of the coupling.
Figure 6:
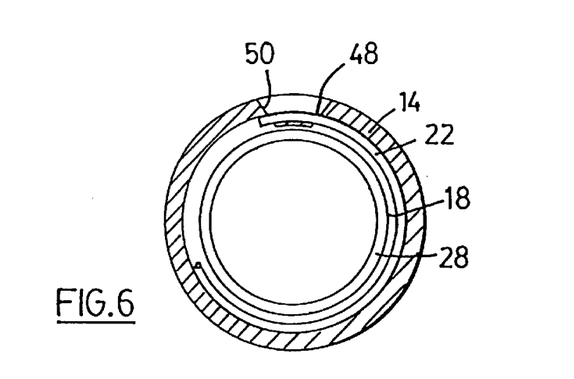
FIG. 6 is a transverse cross-section of the coupling taken through the centre of the depression in the ferrule.

In order to construct the coupling shown in FIGS. 3 and 4, it is first necessary to remove an end section of each of the helical wires 22 and 24. If the reinforced hose has only one helical wire, this single wire would be cut back, the distance depending upon the size of the hose and the size of the coupling. In the case of a flexible hose having both inner and outer wires, both wires would be cut back about the same distance as shown in FIGS. 2 to 4. The cutting back of the wires leaves an end portion of the flexible tubular layers 18 which extends axially beyond the ends of the helical wires.

In one embodiment of the present hose coupling, the hose has the aforementioned inner layer of polypropylene reinforcement having a thickness of 2.5–3 mm. This reinforcement layer is also cut back from the hose end by about ½ inch or 13 mm. This helps to prevent leaking after completion of the hose coupling by improving the sealing effect between the ferrule and the nipple. The reinforcement layer is cut back to approximately the first annular groove 41.

The next step in the assembly process is to place the metal ferrule 14 over the hose. In the case where the ferrule is formed with the depression 46 and the hose has an external helical wire 22, an end piece 62 of the outer wire is inserted through the first hole 48 and then through a second hole 50 so that the end piece of the wire extends across the length of the depression (making it readily visible from the outside of the ferrule). After this step, the end fitting 12 is inserted into the end of the hose by screwing the end fitting relative to the end of the hose in order to thread inner helical wire 24 into one of the two external grooves 32. As shown in FIGS. 2 and 4, the other groove 32 accommodates inward bends 66 formed by the tubular layers 18.

The assembly is then put through a three stage swaging process in order to complete the hose coupling. The ferrule 14 is swaged with a first die which forces the internal rim 52 into the groove 36, mechanically connecting the ferrule to the end fitting 12. The ferrule 14 is supported at the hose end 70 and it is swaged from the opposite nipple end. This allows the diameter of the ferrule to be smaller at the nipple end as illustrated. The first or leading die is of a diameter so that it also secures the hose between the ferrule and the second section 28. After the first swaging step, the inner wire 24 is held in its groove 32. At the same time, the outer wire 22 is held by the wire lock created by the end of this wire extending through the depression 46. The ferrule is then swaged with at least one and preferably two follower dies of smaller diameters than the first die, this step or these steps causing the section 60 of the tubular layers 18 to be tightly clamped between the ferrule and the end fitting in a sealing manner. This method of manufacturing a hose coupling provides a positive leak-proof assembly and there is no need for a molded seal or the use of special injected sealant material between the ferrule and the end fitting. Most couplings constructed in accordance with the invention can be made to form a seal that is able to withstand high fluid pressures, as much as 300 psi and more.

Figure 7:
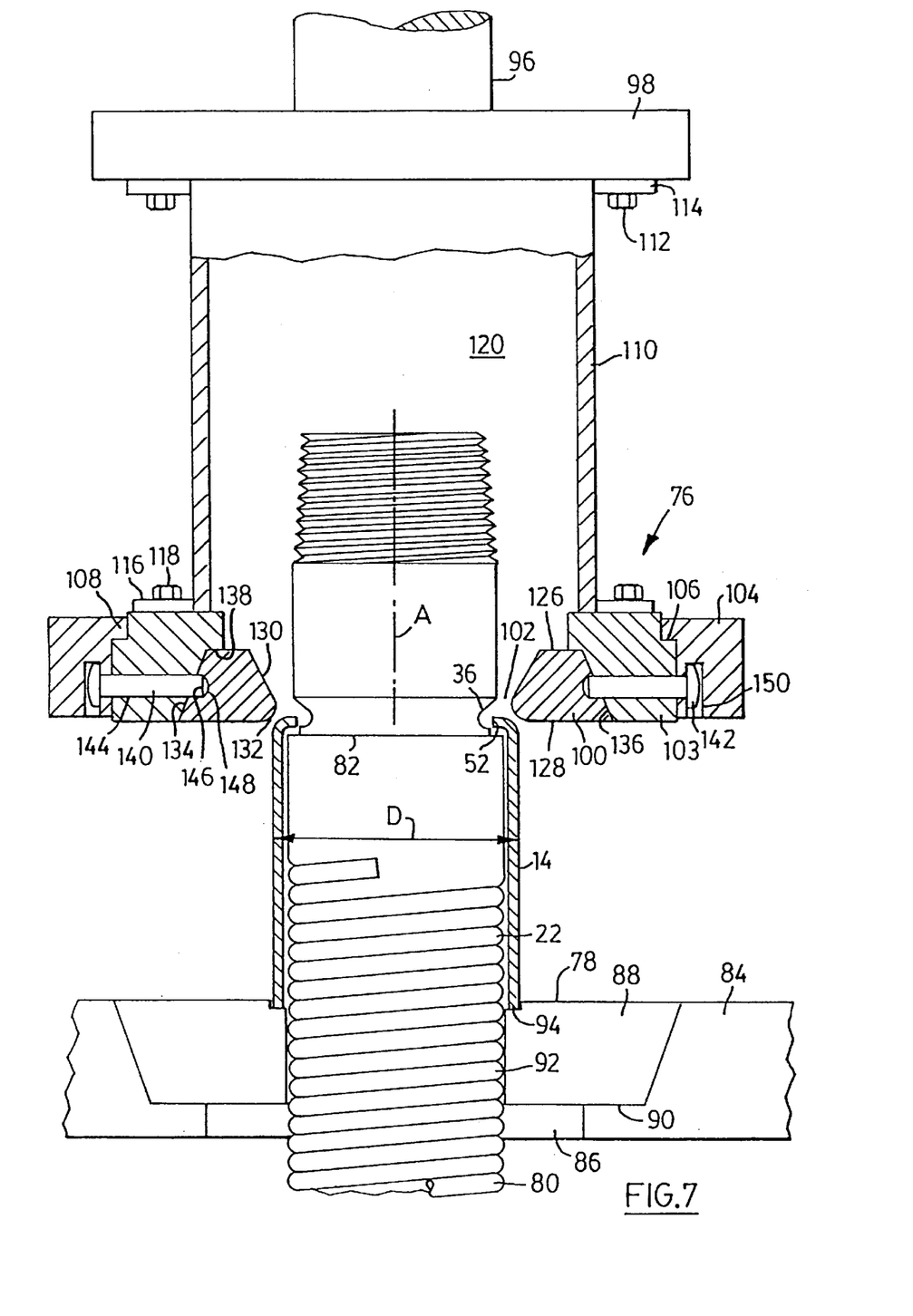
FIG. 7 is a cross-sectional elevation showing the swaging apparatus used to make the hose coupling of the invention.
Figure 8:
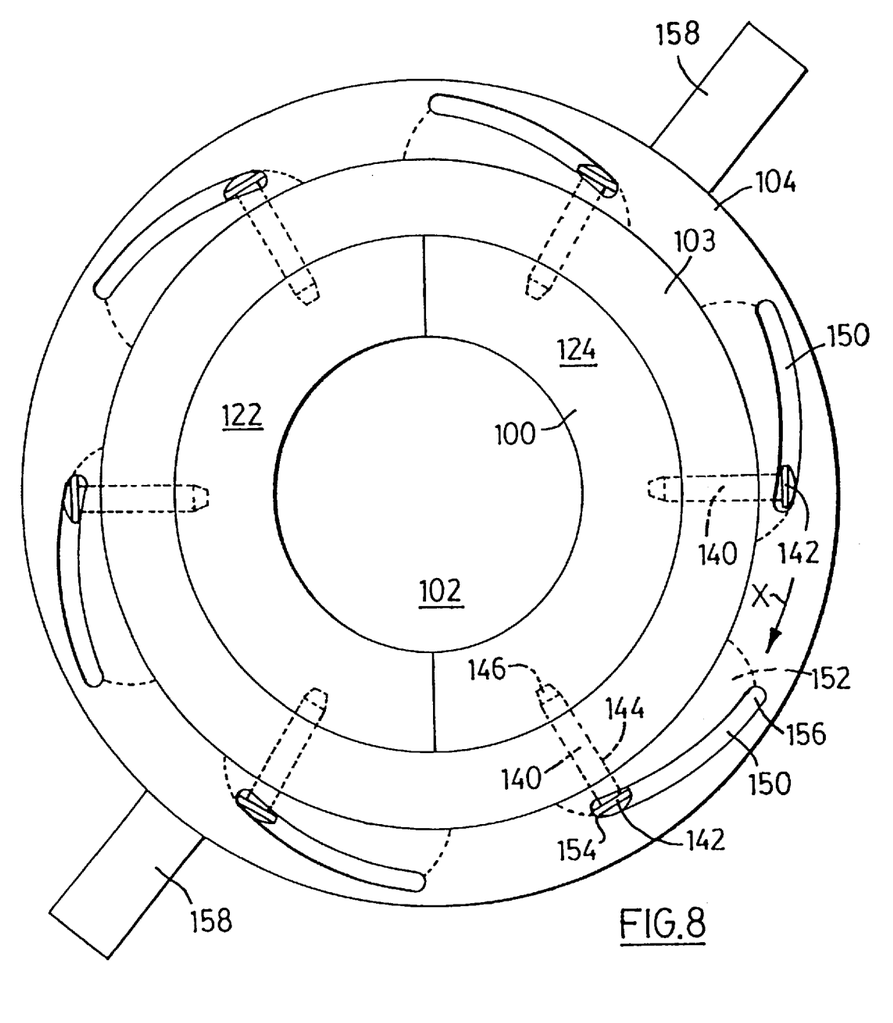
FIG. 8 is a plan view of a die apparatus used in the apparatus of FIG. 7.

FIGS. 7 and 8 of the drawings illustrate a preferred apparatus 76 for making the hose coupling of the invention. The apparatus includes a supporting device 78 for holding one end of a flexible, reinforced hose 80, and the generally cylindrical metal ferrule 14 arranged over an end section of the hose. The rim 52 of the ferrule is located at the top of the upright ferrule and is located at the end of the ferrule closest to the end 82 of the hose. The supporting device 78 comprises a very rigid, horizontal support plate or table 84 having a central opening 86. Removably mounted in the top of the table 84 is an annular support member in the form of a rigid metal locating ring 88 which sits on annular shoulder 90 of the table. The ring 88 forms a circular passageway 92 through which the hose end can be inserted from below. The reinforced hose end should fit snugly in the passageway 92 in order to be supported thereby. Extending about the top of the ring 88 is an annular groove 94 sized to accommodate and locate the bottom end of the ferrule 14 before swaging occurs. Suitable means, such as a standard clamp (not shown), can be provided below the table 84 to hold the hose end in the required position for swaging.

Arranged above the table 84 a suitable distance is a standard, vertically extending hydraulic ram 96 used for the swaging operation. The bottom end of the ram can be fitted with a rigid, steel support plate 98 having suitable bolt openings formed therein (not shown) for attaching purposes. As the hydraulic ram and the equipment for operating same are of standard construction and correspond to other known apparatus for swaging operations, a detailed description of the hydraulic ram in the present application is deemed unnecessary.

As indicated above, in order to carry out the swaging process of the invention, at least two dies and preferably three dies are employed. The first or leading die 100 is shown in FIGS. 7 and 8 and it is an annular die forming a circular die opening 102 having a minimum diameter a little smaller than the initial first external diameter D of the ferrule 14. Set out in Table 1 below are some sample comparative diameters for the first die. A second annular die (not shown) is also used and its construction is identical to that of the first die 100 except that it has a minimum diameter a little smaller than the minimum diameter of the first die 100 (see Table 1 below). It will be understood that the minimum diameter of this second die would correspond to the external diameter of the ferrule portion 58 as shown in FIG. 3.

The following Table 1 sets out some representative diameter reductions in inches in the ferrule 14 provided by first, second and third dies that can be used to swage a ferrule of the diameter indicated in the left hand column:

TABLE 1

| Ferrule Size | 1st Die | 2nd Die | 3rd Die |
| --- | --- | --- | --- |
| 1" | .114 | .112 | .060 |
| 1 ½" | .164 | .122 | .066 |
| 2" | .153 | .121 | .065 |
| 3" | .220 | .117 | .063 |

A mounting arrangement is provided for rigidly connecting each of the first, second, and third dies to the hydraulic ram 96 so that each die can be driven linearly along the exterior of the ferrule 14 starting at the end of the ferrule having the rim 52. The preferred mounting arrangement includes an annular mounting ring or die body 103 in which the first, the second or the third annular die can be detachably mounted and a rotatable cam ring 104 extending about this mounting ring and mounted thereon. The mounting ring 103 can be formed with an external shoulder 106 that extends about the circumference of the ring. A short, inwardly projecting flange 108 formed on the cam ring slidably rests on this shoulder. The mounting ring 103 is itself mounted on a tubular extension 110 that can be detachably connected at its upper end to the support plate 98 of the ram. For example, bolts 112 can be used to connect an upper, outwardly projecting flange 114 to the support 98. The flange 114 can either be welded to the tubular extension or integrally formed thereon. A bottom flange 116 can be provided at the bottom end of the extension 110 and further bolts 118 can be used to detachably connect this flange to the mounting ring. It will be understood that the tubular extension 110 forms a chamber 120 that is sized to accommodate the end fitting together with ferrule 14 during the swaging actions.

As shown in FIG. 8, each of the first, second and third annular dies preferably comprises a split die ring made up of two semi-circular die sections 122, 124. By using a split die ring and the mounting arrangement described herein, it is possible for the operator to release each die even though substantial pressures or forces act on the die after the swaging step has been completed. At the same time, each die has sufficient strength and rigidity to carry out the swaging process properly while being sufficiently supported by the mounting ring. The illustrated die sections shown in FIG. 7 have a flat top surface 126, a flat bottom surface 128, an inwardly and downwardly tapering interior surface 130 and a rounded, internal corner 132.

A significant feature of the annular dies and the mounting ring 103 on which they are mounted is the manner in which these pieces engage one another. As illustrated in FIG. 7, the annular die 100 has an annular outer surface 134 engaging an annular inner surface 136 of the mounting ring 103. In the preferred embodiment, both the outer surface 134 and the inner surface 136 extend at an acute angle ranging between 10 and 20 degrees to a central axis A of the respective annular die as seen in cross-section through this central axis.

In the particularly preferred embodiment, the two surfaces 134 and 136 extend at an acute angle of about 15 degrees to the central axis A. This angle of engagement is important as it must be sufficiently large to permit the split die ring sections to readily disengage from the ring 103 when required. The angle must also be small enough that the split die ring will be sufficiently supported by the ring 103 so that the top and bottom surfaces of the die ring 100 will remain perpendicular to the central axis of the end fitting during the swaging process. It should also be noted that the top surface 126 of the die ring engages a downwardly facing shoulder 138 of the ring 103, this shoulder also helping to keep the split die ring in the correct position.

The mounting arrangement includes a number of retaining pins 140 having heads 142 at their outer ends. The heads 142 are arranged in the aforementioned cam ring 104. The shank of each pin extends through a respective circular passageway 144 formed in the mounting ring 103. In a first position of the retaining pins, inner ends 146 of the pins engage and hold the split die ring in the mounting ring 103. In this position, the pin ends project into an annular groove 148 formed about the exterior of the split die. It will be seen that the pins 140 can be moved from the first position shown in FIGS. 7 and 8 where they hold the split die ring in the mounting ring 103 to a second position (not shown) where the pins are disengaged from the split die ring 100. This movement of the pins arises from the fact that the cam ring 104 has a number of slots 150 formed therein and spaced about the circumference of the cam ring. In the embodiment shown in FIG. 8, there are six of these slots. Each slot extends in a generally circumferential direction and is formed so that the head of its respective pin is captured in the slot. The shank of the pin extends through a narrow gap or slot 152 that extends between the main slot 150 and the inner surface of the cam ring. Because the vertical height of the gap 152 is only slightly more than the diameter of the pin shank, the pin head is secured in its slot 150. It is also noted that one end 154 of each slot 150 is disposed closer to the split die than an opposite end 156. Because of this arrangement, rotation of the cam ring 104 in the direction indicated by the arrow X will cause each retaining pin 140 to be moved radially outwardly, thus becoming disengaged from the split die ring. Rotational movement of the cam ring 104 can be done manually or with the use of a suitable tool using a couple of handles 158 that can be fixedly attached to the cam ring as indicated in FIG. 8.

With the hose coupling components in the position shown in FIG. 7 and the first split die ring 100 mounted in the ring 103, the ram 96 and the attached tubular extension 110 are lowered to carry out the first swaging operation. Downward movement of the die along the ferrule 14 causes the end section of the hose, including an end portion of the helical wire, to be clamped firmly between the ferrule 14 and the end fitting. At the same time, the internal rim 52 is deformed radially inwardly into the annular groove 36. Once this initial swaging step is completed, the ram 96 is raised to a height sufficient to disengage the split ring die 100 from the ferrule. The split ring die is then removed from the ring 103 by rotation of the cam ring. The second split ring die is then inserted into the mounting ring 103 and engaged by means of the pins 140. The ram and the tubular extension are then lowered again for a second swaging step resulting in the second die being driven along the ferrule and, in particular, along the portion 58 shown in FIG. 3. This portion of the ferrule lies adjacent a relatively short end portion of the hose having no helical wire extending about its circumference. This short end portion of the hose is sealingly clamped between the ferrule 14 and the end fitting. Preferably, a third swaging step is carried out on the upper portion of the ferrule using a third split ring die similar to, but slightly smaller than, the second split ring die in order to ensure a good, uniform seal. However, a third swaging step may not be required under some circumstances.

It is desirable that the outer diameter of the nipple section 28 in the present coupling be very close to the inner diameter of the hose end. In a particularly preferred embodiment of the invention, the clearance between the inside of the hose end and the nipple in its cylindrical section 40 is only 20/1000ths inch. By having this very small clearance, it has been found that three swaging steps are sufficient to finish the hose coupling and provide a good, lasting seal.

In addition to its initial ease of manufacture, a coupling constructed in accordance with the invention can often be repaired easier than some prior art couplings. For example, if a coupling made with the end fitting 12 and ferrule 14 should start to leak after a period of time, it is often possible to repair the coupling by simply pushing it through the aforementioned manufacturing dies again. If one attempts to repair prior art couplings that use a special seal or seals or a sealing material, it may be necessary to go through a time consuming process of removing contaminants and unwanted material from the coupling prior to making the actual repair.

The above described wire lock including the depression 46 is particularly useful for large diameter or large bore hose such as dock hose having a diameter of 6 to 8 inches. It will be appreciated that the failure of a coupling in a large hose of this type can be disastrous, possibly resulting in injury and/or a contaminating spill. The use of the aforementioned wire lock provides an extremely secure coupling system that can be readily inspected by users of the hose. By looking at the wire lock one can determine whether or not the hose has been over pressured, in which case the end section of the outer wire 22 may not be seen in the depression or it may be partially withdrawn from the depression.

It will be apparent to one skilled in this art that various modifications and changes are possible to the hose coupling of the invention described herein including the method of manufacturing same. Accordingly, all such modifications and changes as fall within the scope of the accompanying claims are intended to be part of this invention.

I therefore claim:

1. A reinforced hose coupling comprising:

an end-fitting having first and second, axially extending sections, said first section comprising a connecting element and said second section providing a nipple element having external grooves formed thereon;

a metal ferrule mounted on and about said nipple element and connected to said end-fitting, said ferrule having a generally cylindrical wall and an external depression formed in a side of said wall and projecting radially inwardly towards said nipple element, two spaced-apart holes being formed in said depression and through said wall; and a reinforced hose end having flexible tubular layers crimped between said ferrule and said nipple element, said hose end having a helical wire extending about the exterior of said flexible tubular layers, an end piece of said wire extending through said two holes and across said depression.

2. A hose coupling according to claim 1 wherein said depression is elongate in the circumferential direction of said ferrule and said two holes are formed at opposite ends of said depression.

3. A hose coupling according to claim 1 wherein said hose end also has an inner helical wire extending about the interior of said flexible tubular layers and an end portion of said inner helical wire extends along and engages said external grooves of said nipple element.

4. A hose coupling according to claim 2 wherein said tubular layers include one or more plastic tubular layers which extend axially beyond said helical wire that extends about the exterior of the tubular layers, the end portion of the plastic tubular layers located beyond said helical wire being pressed tightly between said ferrule and the nipple element and thereby forming a seal able to withstand high fluid pressure.

5. A hose coupling according to claim 1 wherein said ferrule is formed with a circumferentially extending internal rim at one end thereof and said rim extends into a circumferential groove formed in said end-fitting in order to mechanically secure said ferrule to said end-fitting.

6. A hose coupling according to claim 5 wherein said ferrule has a first axially extending portion with a first external diameter and a second, axially-extending portion with a second external diameter which is less than said first external diameter, and wherein the first portion of the ferrule extends about said helical wire.

7. A hose coupling according to claim 6 wherein said external grooves on the nipple element form a two start thread and said hose end has an inner helical wire extending about the interior thereof, an end portion of said inner helical wire extending along one of two spiral grooves formed by said thread.

8. A hose coupling according to claim 6 wherein said flexible tubular layers include layers of polypropylene fabric and film and said layers extend beyond an end of said helical wire that extends about the exterior of the tubular layers.

9. A reinforced hose coupling comprising:

an end-fitting having first and second axially-extending tubular sections, said first and second sections being separated by a circumferential groove formed in an exterior surface of said end-fitting, said first tubular section comprising a connecting element and said second section having an external helical groove that spirals about its circumference;

a flexible hose end comprising flexible tubular layers of plastics or rubber material, an inner helical wire extending about the interior of said tubular layers, and an outer helical wire extending about the exterior of said flexible tubular layers, said second section of the end-fitting extending into said hose so that said inner helical wire extends along and in said helical groove and circumferentially about said second section, an axial extension of said plastic or rubber tubular layers extending beyond an adjacent end of the inner helical wire and along the exterior of said second section, said outer helical wire ending near said adjacent end of the inner helical wire; and a metal ferrule mounted on said hose end and extending around an end section of said inner helical wire and said axial extension of said plastic or rubber tubular layers, said ferrule having an internal rim at one end which extends into said circumferential groove in order to mechanically connect said ferrule to said end-fitting, wherein said axial extension of said plastic or rubber tubular layers is clamped between said ferrule and said end-fitting, thereby forming a fluid tight seal.

10. A reinforced hose coupling comprising:

an end-fitting having first and second axially-extending tubular sections, said first and second sections being separated by a circumferential groove formed in an exterior surface of said end-fitting, said first tubular section comprising a connecting element and said second section having an external helical groove that spirals about its circumference;

a flexible hose end comprising flexible tubular layers of plastics or rubber material and an inner helical wire extending about the interior of said tubular layers, said second section of the end-fitting extending into said hose so that said helical wire extends along and in said helical groove and circumferentially about said second section, an axial extension of said plastic or rubber tubular layers extending beyond an adjacent end of the helical wire and along the exterior of said second section; and a metal ferrule mounted on said hose end and extending around an end section of said helical wire and said axial extension of said plastic or rubber tubular layers, said ferrule having an internal rim at one end which extends into said circumferential groove in order to mechanically connect said ferrule to said end-fitting, wherein said axial extension of said plastic or rubber tubular layers is clamped between said ferrule and said end-fitting, thereby forming a fluid tight seal and wherein said ferrule has a first, axially-extending portion with a first external diameter and a second, axially-extending portion with a second external diameter which is less than said first external diameter, and wherein the first portion of the ferrule extends around said inner helical wire and the second portion extends around said axial extension of said plastic or rubber tubular layers.

11. A coupling device for flexible, reinforced hose having a helical support wire extending about the exterior of flexible tubular layers, said device comprising:

an end-fitting including means for connecting the device to another fitting and a nipple element for insertion into an end of said hose, said nipple element formed with at least one external helical groove adapted to receive said helical support wire; and a metal ferrule for mounting on said end-fitting so that said ferrule extends around said nipple element and an end section of said hose, said ferrule having an external depression formed in a side thereof and two spaced-apart holes formed in said depression and positioned to receive an end of said helical support wire so that the latter can extend through said holes and across said depression.

12. A coupling device according to claim 11 wherein said depression is elongate in the circumferential direction of said ferrule and said two holes are formed in opposite ends of said depression.

13. A coupling device according to claim 12 wherein said ferrule has an internal rim at one end which is sized and adapted to extend into a circumferential groove formed in an exterior surface of said end-fitting in order to connect the ferrule to the end-fitting.

14. A coupling device according to claim 11 wherein said nipple element is formed with two external helical grooves located one beside the other.

15. A coupling device according to claim 11 wherein said end-fitting has first and second axially-extending tubular sections with the second tubular section forming said nipple element, said first and second sections being separated by a circumferential groove formed in an exterior surface of the end-fitting, said first tubular section providing said connecting means.

16. A coupling device for flexible, reinforced hose having a helical support wire extending about the exterior of flexible tubular layers, said device comprising:
  an end-fitting including a threaded connecting section for connecting the device to another fitting and a nipple element for insertion into an end of said hose, said nipple element formed with at least one external helical groove adapted to receive said helical support wire; and
  a metal ferrule for mounting on said end-fitting so that said ferrule extends around said nipple element and an end section of said hose, said ferrule having an external depression formed in a side thereof and two spaced-apart holes formed in said depression and positioned to receive an end of said helical support wire so that the latter can extend through said holes and across said depression.

17. A hose coupling according to claim 9 wherein said second section has two external helical grooves that spiral about its circumference.

18. A hose coupling according to claim 10 wherein said second section has two external helical grooves that spiral about its circumference.

19. A hose coupling according to claim 10 wherein said flexible hose end also has an outer helical wire extending about the exterior of said flexible tubular layers and ending near said adjacent end of the inner helical wire.

20. A hose coupling according to claim 10 wherein said second section includes a substantially cylindrical sealing section of generally uniform diameter, said helical groove not extending into said cylindrical sealing section, and wherein said second portion of the ferrule extends around said cylindrical sealing section.

* * * * *